United States Patent Office 3,092,899
Patented June 11, 1963

3,092,899
MULTILAYERED COMPOSITE METAL ARTICLE
Robert L. Dega, Utica, Mich., assignor to General Motors Corporation, Detroit, Mich., a corporation of Delaware
No Drawing. Filed Mar. 31, 1958, Ser. No. 724,790
3 Claims. (Cl. 29—182.3)

Conventionally, rotating shafts are sealed by a circumferentially encasing member having a facing material which contacts the cylindrical surface of the shaft. In some instances a radially extending transverse surface is provided on the rotating shaft for axial contact with an annular sealing member to form the seal. Generally, this latter type of seal is employed under high temperature conditions, for example, where elastomeric O-ring shaft seals are not suitable. Such seals can be constructed to form a continuous rubbing contact against a radial surface of the shaft in which the annular sealing member is axially biased by a spring into contact with the shaft. The annular sealing member can also be rigidly mounted around the shaft to form a close tolerance seal of the abradable type. In this latter type of seal axial movement of the shaft during operation brings a radial surface thereof into contact with the sealing member, the shaft abrading the seal to form a small operating clearance which forms an effective seal. Each of these types of seals requires a facing material on the contacting surface of the annular sealing member. A low friction material which is not excessively malleable is particularly desirable as a facing material in both of these types of seals.

United States patent application 725,426, now abandoned, entitled "High Temperature Seal," in the names of Robert L. Dega, Richard R. Topel and Eric Weinman, and United States patent application 725,297, now abandoned, entitled "High Temperature Seal," in the names of Richard R. Topel and Eric W. Weinman, both of which are being filed concurrently herewith, relate to such a seal facing material which is suitable for use under high temperature conditions. The materials disclosed in these applications generally are of a briquetted sintered powdered metal composition containing small amounts of boron nitride. These materials can be used as a facing material in rubbing or abradable type seals. Although such materials are especially useful, extensive utilization thereof has been limited heretofore due to an inadequacy in the methods of bonding the materials to a supporting member. The porosity of the material, as well as the presence of boron nitride on its surface, prevents a satisfactory bonding by conventional methods.

An object of this invention is to provide a multilayer article in which a base metal is bonded to a sintered briquetted powdered metal composition having a non-porous thin surface coating of a suitable metal by a metallurgically compatible brazing alloy.

In accordance with the invention, it is contemplated that a sintered briquette of a mixture of a powdered metal and boron nitride are bonded to a suitable backing metal by means of a brazed joint. Boron nitride on the surface of the briquette is removed by means of a suitable etchant. A metallic coating is subsequently applied to the etched surface of the briquette which is then placed on a suitable backing metal to form a bonding interface. A brazing material is thereafter applied to the bonding interface in the usual manner and melted to join the briquette to the backing metal.

Other objects, features and advantages of the present invention will become more apparent from the following description of preferred embodiments thereof.

Powdered metal mixtures containing a major proportion of copper are especially useful as seal facing materials for many applications. Such powdered metal mixtures are usually briquetted under a pressure of approximately 30 tons per square inch to 60 tons per square inch. The briquetted seal material is thereafter sintered in an inert atmosphere at a suitable temperature for a sufficient time to obtain the desired amount of diffusion alloying. Sintering at a temperature above 1000° F. for at least one half hour generally provides satisfactory results.

The high porosity of the above materials inhibits the formation of a strong bond by usual brazing techniques. At the brazing temperature the molten brazing material is absorbed to such an extent by the porous seal material that only a minor amount of the material remains in the bonding interface. Thus, not only does a weak brazed joint result but a substantial portion of the seal material itself is adversely affected by alloying with the brazing material. Additionally, boron nitride present in the surface regions of the briquette deleteriously affects the alloying of the brazing material with the briquette in the bonding interface.

The boron nitride can be removed from the surface of the briquette by means of a suitable etchant. One such etchant which can be used is a strong hydrofluoric acid solution. Although boron nitride is soluble in hydrofluoric acid solutions of varying concentrations, it has been found that the removal of the boron nitride is accomplished expeditiously with a hydrofluoric acid solution containing 90% by volume hydrofluoric acid and 10% by volume water. After etching, the briquette is thoroughly rinsed to remove the last traces of etchant which may have been absorbed and still adheres to the briquette.

The high porosity of the seal material is reduced by applying a suitable metal coating to the etched surface of the briquette. The thickness of the metallic coating can vary to an appreciable extent. It is preferred that this coating be thick enough however to form a fairly impervious coating over the porous briquette of seal material. This coating serves to close the surface pores of the briquette, thereby inhibiting absorption of the brazing material and subsequent weakening of the brazed joint. A coating of 0.002 inch had been found to provide satisfactory results, although a coating thickness of approximately 0.001 inch to 0.005 inch is generally satisfactory.

The method by which this coating is applied is not considered to be particularly essential to the invention. Any method which produces a substantially non-porous uniform deposit of the desired metal on the etched surface of the briquette is usually useful. Especially satisfactory results have been obtained in bonding when the etched surface of the seal material is coated with a thin layer of copper or tin. In general, a thin coating of copper can be applied to the etched surface by any of the conventional copper plating electrolytes of the cyanide type. As is known, conventional cyanide copper plating baths, as initially formulated, generally comprise aqueous solutions of free alkali metal cyanide, copper cyanide, and an alkali metal hydroxide. In operation, sodium carbonate or potassium carbonate are formed in the cyanide copper plating baths. An example of one such copper plating bath of the cyanide type is as follows:

| | Ounces per gallon |
|---|---|
| Copper | 5.4 |
| Free sodium cyanide | 1.2 |
| Potassium hydroxide | 5.12 |
| Potassium carbonate | 10.8 |

Should there be an excessive amount of surface oxides on the coated surface, they can be removed in the usual manner, such as by fluxing. The coated briquette is then placed on a suitable backing metal with the coated surface adjacent the surface of the backing metal to form an assembly having a bonding interface. A brazing material is next placed in the bonding interface and the assembly is thereafter heated to a brazing temperature.

As is customary, it is desirable to employ a brazing material which will alloy with both the coating on the surface of the seal material and with the backing metal. The preferred composition of the brazing alloy depends not only upon its alloying characteristics but also upon the temperatures to which the bonded joint will subsequently be subjected. In general, brazing materials which are alloys of silver, copper and zinc, commonly referred to as silver solders, are advantageously used for bonds which are subjected to elevated temperatures. These silver alloy brazing materials are particularly satisfactory for bonding copper or tin to nickel base alloys or ferrous alloys. One such silver alloy brazing material which can be used to braze copper or tin to a ferrous base contains about 65% silver, 20% copper and 15% zinc, all measurements by weight. A satisfactory bond is formed between these metals when the assembly is heated to a temperature of approximately 1340° F. for about five minutes.

In the brazing operation the assembly is heated to a suitable temperature for a sufficient time to melt and alloy the brazing material in the bonding interface. Of course, the specific temperature to which the assembly is then heated and the duration of heating are dependent upon the properties of the specific alloy selected as a brazing material.

To inhibit corrosion or oxidation of the seal material and backing metal at the elevated brazing temperatures, it is advantageous to perform the brazing operation in a non-oxidizing atmosphere. Nitrogen, argon, helium, carbon dioxide and mixtures of these gases are examples of suitable non-oxidizing atmospheres. A stronger brazed joint is effected, however, if the brazing operation is conducted in a reducing atmosphere. Under such brazing conditions prior fluxing is usually unnecessary if the bonding surfaces are not excessively corroded. Moreover, a more thorough removal of surface oxides is obtained by this method, thereby permitting the formation of a stronger brazed joint. Heating to the brazing temperature in an atmosphere of cracked ammonia (one part by volume nitrogen and three parts by volume hydrogen) is generally satisfactory for this purpose. Other reducing atmospheres which can be used are those containing substantial amounts of carbon monoxide and hydrogen.

An example of an appropriate powdered metal base seal material which can be bonded by the present invention contains 30% by weight nickel, 70% by weight copper and 2.65% boron nitride by weight of the metallic base material. This composition is preferably briquetted under a pressure of approximately 50 tons per square inch and thereafter sintered in an inert atmosphere at a temperature of approximately 1900° F. for about three hours. The sintered briquetted seal material is then immersed for several minutes in a strong hydrofluoric acid solution containing 90% by volume hydrofluoric acid and 10% by volume water. The briquette is then removed from the etched bath and thoroughly rinsed with water to remove any hydrofluoric acid adhering thereto. A thin coating of copper of about 0.004 inch is next electrodeposited onto the etched surface of the briquette to form a uniform substantially non-porous coating. The briquette is next placed on a clean stainless steel backing member with the copper coated surface adjacent the surface of the backing metal. A thin sheet having a thickness of 0.005 inch of a silver alloy containing 65% silver, 20% copper and 15% zinc, all measurements by weight, is placed between the adjacent surfaces of the briquette and the backing member. The assembly is heated in a cracked ammonia atmosphere for about five minutes at a temperature of about 1350° F. and thereafter substantially cooled in the same atmosphere. The article thus formed consists of a multilayered structure having a stainless steel base member and, successively, a thin layer of a silver alloy brazing material, a thin layer of a solid metal and an uppermost layer of a briquetted sintered powdered metal composition containing boron nitride.

It is understood that although this invention has been described in connection with certain specific examples thereof, no limitation is intended thereby except as defined in the appended claims.

I claim:

1. A multilayered composite article of manufacture comprising a steel base member having a layer of a silver alloy brazing material metallurgically bonded thereto, a thin impervious electrodeposited coating of copper metallurgically bonded to said silver alloy layer, and metallurgically bonded to said impervious copper layer, a briquetted sintered powdered metal mixture consisting essentially of a copper base powder and about 2% to 6% boron nitride by weight of the copper base powder, said briquetted mixture having a lesser concentration of boron nitride immediately adjacent said copper layer.

2. A multilayered composite article of manufacture comprising a nickel base alloy member having a layer of a silver alloy brazing material metallurgically bonded thereto, a thin impervious electrodeposited coating of copper metallurgically bonded to said silver alloy layer, and metallurgically bonded to said impervious copper layer, a briquetted sintered powdered metal mixture consisting essentially of a copper base powder and about 2% to 6% boron nitride by weight of the copper base powder, said briquetted mixture having a lesser concentration of boron nitride immediately adjacent said copper layer.

3. A multilayered composite article of manufacture comprising a base member of a metal selected from the group consisting of ferrous base alloys and nickel base alloys, said base member having a layer of a brazing material metallurgically bonded thereto, said brazing material being metallurgically compatible with said base member metal and with copper, a thin impervious layer of copper metallurgically bonded to said layer of brazing material, whereby said copper layer is brazed to said base member, and metallurgically bonded to said impervious copper layer, a briquetted sintered powdered metal mixture consisting essentially of a copper base powder and about 2% to 6% boron nitride by weight of the copper base powder, said briquetted mixture having a lesser concentration of boron nitride immediately adjacent said copper layer.

References Cited in the file of this patent

UNITED STATES PATENTS

| | | |
|---|---|---|
| 2,024,150 | Davignon | Dec. 17, 1935 |
| 2,191,460 | Fisher | Feb. 27, 1940 |
| 2,241,095 | Marvin | May 6, 1941 |
| 2,251,410 | Koehring | Aug. 5, 1941 |
| 2,424,557 | De Bra | July 29, 1947 |
| 2,461,410 | Clark | Feb. 8, 1949 |
| 2,473,712 | Kinney | June 21, 1949 |
| 2,539,246 | Hensel | Jan. 23, 1951 |
| 2,615,235 | Hadley | Oct. 28, 1952 |
| 2,690,409 | Wainer | Sept. 28, 1954 |
| 2,706,759 | Williamson | Apr. 19, 1955 |
| 2,740,191 | Kuzmick | Apr. 3, 1956 |
| 2,746,134 | Drummond | May 22, 1956 |
| 2,839,413 | Taylor | June 17, 1958 |
| 2,888,738 | Taylor | June 2, 1959 |
| 2,902,748 | Schaeter | Sept. 8, 1959 |
| 2,906,007 | Bibbins | Sept. 29, 1959 |